Dec. 31, 1940.   F. H. HATELY   2,227,408
FLUID SEAL
Filed Dec. 26, 1939
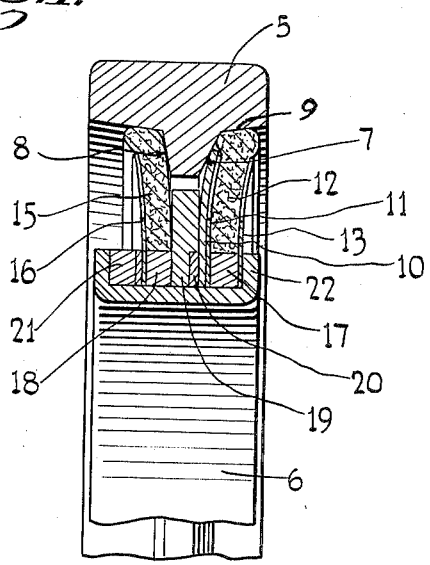
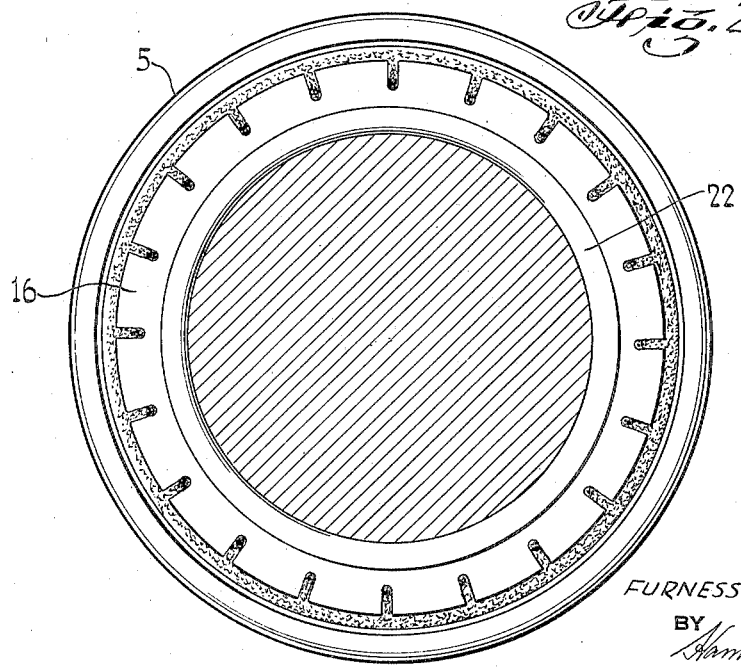
INVENTOR
FURNESS HALL HATELY
BY
ATTORNEYS Patented Dec. 31, 1940

2,227,408

UNITED STATES PATENT OFFICE 2,227,408

FLUID SEAL

Furness Hall Hately, Greenwich, Conn., assignor to American Felt Company, New York, N. Y., a corporation of Massachusetts Application December 26, 1939, Serial No. 311,045

7 Claims. (Cl. 286—11)

The present invention relates to fluid seals and has for an object to provide a seal capable of effectively preventing oil, grease or other fluid from passing along a rotating shaft between said shaft and the wall of a casing through which the shaft extends, or along a dead shaft or axle between said shaft and the hub of a wheel or the like rotating thereon.

Another object is to provide a tight seal, between a relatively rotating shaft and a casing wall, which will not be broken upon reasonable longitudinal movement of the shaft relative to the casing wall.

Another object is to provide a seal permitting a reasonable relative eccentric movement of the shaft without leaking.

Another object is to provide a seal unit which incorporates both the relatively stationary and the relatively rotatable sealing elements in the structure and which unit can be applied in a practicable and convenient manner.

It is known practice to provide seals in various positions to prevent the flow of oil or grease along a shaft and out of a casing in which the shaft operates and through which the shaft extends as, for example, in the case of the drive shafts and the axles of automobiles and in various machines.

In many installations, for example in machinery used in operating upon fine fabrics and other material where escape of oil may damage the material, and in overhead shafting hangers and the like, it is desirable to provide an oil seal which allows so exceedingly minute an escape of oil from within the housing through which the shaft extends that for all practical purposes it may be considered perfectly tight. This condition may be called "effectively tight."

The present invention has been developed more particularly to provide on oil seal for general application which can be made effectively oil tight.

Such an embodiment will be described for the purposes of illustrating the principles of the invention but it will be understood that this use is illustrative merely and that the seal is adapted for use also for retaining various other materials such as soap in liquid condition, liquid chemicals and even vapors and other gases. The seal shown is designed both to retain oil and to exclude extraneous material.

The invention provides a seal within a member having a smooth annular bearing surface is engaged by a flexible impervious annular member rotatable thereagainst to provide an edge contact, which is preferably substantially a line contact, against the smooth surface. When the seal is used as an oil seal, an oil film forms between the relatively moving surfaces and inhibits wear. For convenience of description the parts will be defined herein as "contacting" even though the oil film actually causes a certain separation as in the case of journal bearings so that the parts may be said more accurately to move on an oil film without a true contact.

In the embodiment more particularly herein described for the purpose of illustrating the principles of the invention, the member providing the smooth bearing face, or sealing face, is the outer member and it is fixed within the casing. For convenience it is hereinafter referred to as the "race." The yieldable flexible impervious member or diaphragm engaging the bearing surface to provide a fluid tight seal is carried by the rotating shaft and rotates therewith. It will be understood, however, that a reversal of arrangement of the elements whereby the race is carried by the shaft and the flexible diaphragm is carried by the casing is possible while retaining certain features of the invention.

It is important that the parts shall be so constructed and arranged that the contact or coaction between the flexible impervious member and the smooth bearing surface against which it moves shall be at an edge of one part, preferably at the edge of the impervious member, as distinguished from an arrangement in which a side face of the impervious member bears against the smooth bearing face at a position spaced from the edges of both elements. Furthermore, it is advantageous to so arrange the elements that the contact is relatively a line contact, that is, a very narrow contact, between the edge of one member, preferably the flexible impervious member, and the face of the other member, as distinguished from an arrangement in which a wide face to face contact obtains.

It is important that the edge of the impervious diaphragm which bears against the sealing face should be of such character as to provide an effective seal and prevent passage of oil. This is best effected by forming the diaphragm to provide a sharp continuous smooth edge which will give substantially a line contact against the sealing face. The diaphragm at least at the edge is preferably of dense incompressible material which, however, will have a low coefficient of friction against the sealing face. The sealing edge will then maintain its condition to provide an unbroken sealing line contact in use.

It is one of the features of the invention that the seal is so constructed that the pressure of the impervious diaphragm against the bearing surface is so correlated with the penetrative quality of the oil that on the one hand the pressure will be sufficient to prevent too thick a film of oil which will therefore migrate and on the other hand the pressure will not be sufficient to prevent the formation of a film of oil which will lubricate the surfaces. In general the spring pressure should be higher in proportion as the oil is of greater penetrative quality. The penetrativity of some oils increases considerably at higher temperatures and in some installations this must be taken into account in designing seals. It is possible where the original specific pressure is too high that through a slight broadening of the diaphragm edge due to wear or heat induced plastic deformation a suitable reduction in specific pressure may be effected such that both lubrication and sealing result, where the pressure is too high and the initial speed is not excessive.

It has been found that a more perfect seal is obtained if the flexible impervious member forms a slight angle with the smooth bearing face, for example an angle of at least 5° and preferably between 5 and 10 or perhaps 15°. The impervious member should be formed of a material which meets several different requirements. The diaphragm should be of a character to deflect to the extent required without offering too great resistance to deflection and without scalloping at the edge. It should also be of such character that it will not be permanently deformed, that is take a set that will prevent externally induced flexing to cause it to follow and bear on the race or rather on the film between it and the race during relative movement of the parts away from each other. A partial set in a dished or saucer shape is not objectionable if the diaphragm under the existing supporting condition still retains sufficient resiliency to follow the race during such movement as occurs in use. The diaphragm must be of such character that under the conditions of use it must resist the action of oil, grease or other fluids to which it is exposed, and must withstand indefinitely the heat to which it is exposed.

It has been discovered that many materials which operate perfectly to provide a seal when the parts are stationary and when the shaft is first rotated, fail seriously in operation when heat develops in the system. Excellent results in seals made according to the present invention have been obtained with impervious members of fibrous material impregnated with phenolic condensation products or other similar products. The material used in the seal shown is a laminated sheet structure of fine cotton or linen fabric impregnated with Bakelite and sold under the trade-mark "Formica" by the Formica Insulation Company of Cincinnati, Ohio. This material contains in its body portion an impregnation of phenol formaldehyde. It may or may not have on its faces a coating of urea formaldehyde or other surface material resistant to fluids to be sealed. More specifically, the preferred material according to the invention consists of two plies of linen, cotton or equivalent of fine weave of a thickness of about 0.005" to 0.006" impregnated with phenol formaldehyde pressed together and cured between two dull-polished stainless-steel platens at a temperature of about 308° F. obtained by applying steam under a pressure of about 75 pounds per square inch within the platen. The impregnation is such that the cured sheet is of a thickness of about 0.010 to 0.014" with a very thin coating of free plastic at each surface. The bearing edge of a diaphragm made of this material is smooth and sharp and maintains this condition since the material is dense, substantially incompressible and durable. The diaphragm material is defined in the claims as of a hardness to maintain substantially line contact against the race, in order to distinguish the diaphragm material from leather and other compressible materials which are not suitable because they will not maintain the sealing line contact. In seals for shafts of a diameter of less than 1½", material of a thickness of about 0.010 to 0.012" is used and in seals for shafts of 1½" diameter or larger, material of a thickness of about 0.012 to 0.014" is used. The temperature of cure is important, but is believed not to be particularly critical. Curing at a temperature obtained by using steam at about 75 pounds pressure produced an excellent material for diaphragms, whereas similar material cured at a temperature of about 358° F. obtained by applying steam at a pressure of 150 pounds per square inch proved definitely less satisfactory for oil seals. As one disadvantage the diaphragms made thereof were subject to permanent deformation and stiffening in use requiring substantially stronger supporting means. Other plastics having greater resistance to particular materials to which the seal is exposed may be substituted as desired. Plastics which cure upon application of heat or by other processes to a stable condition resistant to further change are preferred.

Various other fibrous materials impregnated with resinous condensation products may be substituted as equivalents. Many experiments including endurance tests have established that materials of this type are especially effective, and especially durable in use. They are preferable to many other impervious flexible materials which, in the broader aspects of the invention, are the equivalent thereof. The material selected should have a substantial stiffness, but should flex without cracking or checking at the surface.

Formica and some other similar products are suitable for use at reasonable speeds and for sealing low penetrating oils even with races which have not been given a thoroughly smooth finish, as they, because of lapping characteristics, cause an exceptionally high polishing of the contact area without excessive grooving and without excessive wear of the material itself.

In accordance with the present invention in its preferred embodiment the race at least at the sealing surface for the purpose of grinding is hardened or case hardened, and drawn to a Rockwell C hardness of 60 to 63. The sealing face is finished to provide a smooth bearing surface. A full super finish is ideal, although a modification using a 150 grit wheel for sizing and a reciprocating 400 grit wheel for finishing is suitable.

Further as to some characteristics and attributes of the material from which the flexible, impervious diaphragm can best be made; friction between the edge of this diaphragm and the frustro-conical annular element that it bears against, or more accurately friction of the molecules of the oil or other fluid film between the sealing elements heats the diaphragm edge and tends to expand it. If it were of such a material as metal, the higher temperature at the edge would make this circular edge depart from its plane, take up a scalloped contour and break or impair the seal. The same incipient tendency to "scallop" is less in a plastic material like Formica and is effectively offset by the pressure of the disk spring so that it results only in a circumferential forming of the working edge without "scalloping." This "forming" is not excessive, especially in the above described composition and when the forming pressure is removed the diaphragm returns to nearly its original flat condition. This need to avoid scalloping determines one property desirable in the diaphragm material.

As stated before, Formica, especially that particularly described, is one material that well meets the various requirements, such as permanence at working temperatures, freedom from cracking and ability to flex from initial flat form to the saucer-shaped form desired under working conditions in the structure shown and to return to substantially flat form, at least under the urging of the spring.

The nature and objects of the invention will be better understood from a description of an illustrative embodiment of the invention for the purpose of which description reference should be had to the accompanying drawing forming a part hereof and in which—

Figure 1 is a central sectional view of an oil seal embodying the principles of the invention, wherein the parts are in diaphragm loaded alignment, and Fig. 2 is a side view taken from the left of Fig. 1 and showing a part broken away.

In the construction shown, the seal comprises an outer member or race 5 which in use is fitted tightly within the casing to prevent any possible leakage of oil between the race and casing and an inner member 6 designed to fit as tight on a shaft which ordinarily is the rotating element.

Obviously the shaft may be a dead shaft and the casing may be the hub portion of a wheel or other rotating member. The outer member or race 5 of the arrangement shown is formed to present a central inwardly directed annular flange-like portion having two opposite bearing faces. The bearing face 7 will for convenience be termed "the sealing face" and the face 8 will be termed "the outer bearing face" because ordinarily it faces outward but the term is not intended as implying a limitation.

The inner member or flanged sleeve 6 supports the rotating parts of the seal shown. In order to prevent flow of oil longitudinally of the shaft between the rotatable member 6 and the race 5, an arrangement of flexible members is provided whereby an effective tight seal is maintained at all times whether the parts are relatively rotating or at rest. As shown, the sealing face 7 is engaged by an impervious supported flexible disk or diaphragm 10 which is maintained yieldably in contact with the sealing face 7, thereby maintaining oil sealing contact even during slight relative longitudinal movement of the race and the sleeve and also maintaining contact during eccentric relative movement of these parts.

It is contemplated that ordinarily the seal will be arranged with the concave side of the diaphragm toward the oil or other fluid to be sealed but it will seal effectively when reversed, that is to say when the oil or other fluid to be sealed contacts with the convex side of the diaphragm. If the seal is to be used in reversed position, it is sometimes desirable to use a slightly stronger spring to maintain contact between the diaphragm and the race, especially if the fluid is under pressure.

The impervious diaphragm is cut from a sheet of Formica or equivalent material of a thickness of about 0.01 to 0.03 of an inch. A thickness of 0.010 to 0.014 of an inch for seals for shafts of the diameter of 1 to 3 inches is preferred, as hereinabove explained. In cutting the diaphragm care is taken to insure a sharp continuous edge without nicks or blemishes for engagement with the sealing face 7, as distinguished from a roughly cut or rounded edge. It is to be noted that in the arrangement shown the area of contact between the bearing face of the race and the flexible diaphragm partakes of the nature of a line contact as contrasted with an extended face to face contact and it terminates sharply at the outer edge or corner of the diaphragm as contrasted with the condition which would obtain if the outer edge were rounded or irregular. Each of these two features contributes to the effectiveness of the seal. It is preferred that both features be embodied in the seal.

In the embodiment illustrated this is accomplished by so designing and assembling the interengaging parts that an "edge contact" is maintained between the outer edge of the impervious flexible member and the sealing face 7 of the race. To maintain such an edge contact in the illustrated arrangement, the angle of the surface 7 to the plane of the race is made between 10 and 30° and the resiliency of the impervious flexible member and of the means pressing the same against the sealing surface are such that the angle between the sealing surface 7 and the engaging face of the impervious member at its contacting edge is small, preferably between 5 and 15°. As shown, the edge of the impervious disk 10 is pressed against the sealing face of the race by a disk finger spring 11. It is important that the spring and diaphragm should be mutually concentric and of substantially the same size to maintain effective sealing.

The material of the diaphragm has a certain stiffness yet it is and should be very flexible. The material at the edge should be substantially incompressible and unyielding, so that a sharp edge will be maintained. In the most satisfactory seals that have been made in accordance with the invention, the diaphragm is of such thinness and flexibility as to require support substantially at its edge to maintain the sharp edge contact which provides effective sealing. For example, if the disk spring and diaphragm are substantially eccentric relatively or if the disk spring is of too small diameter, the edge of the diaphragm where not well supported may roll or bend away from the race, so that a sharp edge contact is not maintained and in that case the seal will leak.

The diameter of the disk spring, therefore, is so chosen that it will definitely insure contact of the edge of the impervious member with the sealing face 7, and at the same time such that it will not itself engage the sealing face. This is accomplished by making the spring and the impervious disk of substantially the same diameter. The diaphragm should preferably not extend beyond the spring a distance greater than one-half, or better, one-third its own thickness. The spring should not extend beyond the diaphragm to such extent that it can engage the race.

A protective disk 12 of felt or equivalent material is provided adjacent the spring disk 11 and in turn this felt disk is pressed inward by a spring disk 13. The felt disk filters the oil and serves to prevent any fine particles of grit from entering into the position of engagement of the impervious member and the sealing face of the race. Accordingly the felt disk is of a size to fit as closely as may be against the face 7 and the adjacent face 9 of the race. In use the felt presses inwardly against the face 7 in position exterior to the impervious disk 10 and the spring 11. The spring 13 maintains the felt member pressed firmly toward the surface 7.

As the result of the yieldable spring pressure, the impervious member and the felt are maintained in effective engagement with the surface 7 during rotation even during such movement as is caused by eccentricity of the shaft relative to the race and during such longitudinal movement of the shaft relative to the casing as may occur due to bearing wear, provided the relative movement does not exceed that for which the seal is designed.

The outer bearing face 8 of the race shown as at an angle of 9° to the plane of rotation is engaged by a protective disk 15 of felt or other equivalent materials which in turn is pressed inward by a disk spring 16 to maintain effective contact. The bearing face 8 may be given the same finish as the sealing face 7, if desired to reduce friction. However, this is not necessary, a less carefully finished surface being reasonably sufficient. The disk 15 is provided to exclude dust and dirt from the exterior in order to avoid possibility of dirt getting into the seal and between the sealing face 7 and the impervious member 10. The felt is preferably impregnated with a suitable lubricant such as colloidal graphite or the like dispersed in a suitable solvent such as carbon tetrachloride or other suitable carrier in combination with a water-repellent such as solvent dispersed asphalt. In operation the pressure of the graphite and asphalt impregnated felt member 15 against the race is low and ordinarily substantially less than that of the diaphragm against the race. This arrangement is preferred because a high pressure is not necessary for the exclusion of dirt and the heating effect due to friction is less. A temperature rise of 40° C. caused by friction is not excessive and when the parts are properly constructed and the respective surfaces of the race are suitably finished, this temperature need not be exceeded.

In mounting the several annular members on the sleeve 6, it is necessary to provide a rigid structure of considerable mechanical strength and also to insure a complete oil-tight condition to prevent by-pass through the seal. Accordingly, the felt members are made of an internal diameter greater than the external diameter of the sleeve 6 and metal spacing rings or the equivalent of substantially the thickness of the felt members are fitted within the felt members and the parts clamped together. As shown, a metal ring 17 is fitted within the felt member 12 and between the springs 11 and 13 on the sleeve 6. A similar metal ring 18 within the felt member 15 spaces said felt member from the sleeve. A spacer ring 19 between the diaphragm 10 on the one hand and the ring 18 and felt member 15 on the other hand spaces the parts which bear against the opposite surfaces 7 and 8 of the race. The spacer ring 19 is recessed on one side, preferably on the side toward the impervious member 10 to receive a lead packing ring 20 which insures an oil-tight joint. The ring 19 may be made in two parts for convenience in manufacture. An outer retainer ring 21 is provided as a supporting member for the closing operation and the three disk springs, the impervious flexible member 10, the spacer members 17, 18 and 19 with the lead gland 20 and the retainer ring 21 are all firmly clamped by forming the end of the flanged sleeve 6 outward around the ring 21 to provide the flange 22.

All of the springs 11, 13 and 16 are of the same disk finger spring type and substantially as shown in Fig. 2. The tension of the diaphragm spring 11 may vary as conditions of use of the seal may require. If the seal is to be used for sealing oil of high penetrative quality, then the spring 11 which presses the diaphragm against the race should exert a correspondingly high pressure. If, on the other hand, the seal is to be used with oil or grease of low penetrative quality or with fluid of low lubricating properties, the spring 11 should be so selected as to exert a correspondingly low pressure against the diaphragm in order to permit entrance of a sufficient film to provide lubrication. The pressure should not be so high as to prevent the formation of a lubricating film between the relative moving parts, and it should not be so light as to permit film migration. The tension of the springs will depend upon the thickness of the material and the number of fingers. The number of fingers should be sufficient to maintain well distributed pressure. Such distributed pressure is better maintained with finger springs than with continuous disk springs. The springs may be made, for example, of blued spring tempered Swedish steel of a thickness of about 0.003 to 0.012.

In practice it has been found desirable to provide springs of several different tensions to suit the conditions of different fluids.

The strength of the spring holding the felt members 12 and 15 against the race is relatively low as high pressure is not necessary and is not desirable because of the creation of unnecessary friction and heating.

The angle of the sealing face 7 relative to the plane of the race may vary with the size and the requirements of use of the seal. In general ordinary use an angle of about 20° is preferred. If a relatively greater movement of the race and the inner members either radially or longitudinally is to be accommodated because of eccentricity of the shaft, wear of bearings or otherwise, the seal should be designed to provide a greater difference of diameter between the effective diameter of the race and the flanged sleeve with correspondingly greater radial width of the flexible diaphragm and spring disks, that is to say greater width from the inner to the outer edges.

The race may be made of hard, medium or soft steel or other metal, suitably heat treated if desired, depending upon the requirements of use and particularly the speed of rotation. For some uses other materials than metal may be preferred. For high speeds and penetrating fluid where smooth finish is desired heat treated steel is preferable, whereas for low speed work or in use with oils of low penetrating quality soft steels, die cast aluminum, plastic compositions or other materials will be found satisfactory. The surface 7 is preferably hardened and super-finished as above noted, but other methods of providing a smooth surface are sufficient to satisfy less rigid requirements.

Both felt members may be thicker, when not compressed, than the metal spacer elements within the felt members. Preferably they are firmly clamped at their inner edges.

The proportions and arrangements are such that ordinarily, and preferably, the impervious diaphragm member (when under sealing load) is convex or at least flat toward the sealing surface 7.

It is important that the several parts of the seal be suitably proportioned in accordance with the conditions of the particular use if the best efficiency is to be obtained. For instance, the flexing section of the diaphragm and its spring, that is the section that extends outward from the spacing or clamping ring 17, should be of a dimension to provide the necessary flexibility to accommodate the relative longitudinal and eccentric movement.

As an illustrative example a seal for a high speed shaft of a diameter of 1⅝", which has proved particularly satisfactory and durable in use, is illustrated in the drawing drawn substantially to scale. The principal dimensions are as follows—

|  | Outside diameter | Inside diameter | Thickness or width |
|---|---|---|---|
| Race 5 | 2.56 | 2.13 | 0.342 |
| Sleeve 6 | 1.70 | 1.62 | 0.322 |
| Sleeve flanges | 1.84 |  | 0.048 |
| Formica diaphragm 10 | 2.23 | 1.703 | 0.013 |
| Springs 11, 13, 16 | 2.227 | 1.703 | 0.005 |
| Spacer 17 | 1.842 | 1.698 | 0.050 |

The angle of inclination of the sealing surface 7 to the plane of the race is 27°. The angle of inclination of the surface 8 is 9°.

The several springs are cut substantially as shown in Fig. 2 to provide 20 fingers.

The thickness and number of fingers of the spring 11 as given above gives a spring of the strength necessary for average oil when the spring is made of spring tempered blued Swedish spring steel, but for oils of greater penetrative quality springs of greater thickness and fewer fingers are provided while for oils of lower penetrative quality springs of less thickness are desired. The spring used should be of such strength and of such design as to maintain the necessary pressure during the variations of deflection due to the eccentric and longitudinal movement of the shaft in operation.

The foregoing particular description is illustrative merely and is not intended as defining the limits of the invention.

I claim:

1. An oil seal comprising, in combination, an annular member having a smooth annular sealing face, a flexible annular member of organic material impervious to oil bearing only at its edge against said sealing face at a slight angle thereto to provide substantially a line contact and rotatable thereagainst, and yieldable means engaging said impervious annular member and pressing the same yieldably against said sealing face said flexible annular member having a substantially incompressible wearing surface formed of plastic material and being of a hardness to maintain such line contact.

2. A fluid seal, as defined in claim 1, wherein the impervious flexible annular member is made of a fibrous material impregnated with a plastic composition insoluble in oil.

3. A fluid seal comprising, in combination, an outer annular race having a super finished smooth concave sealing face, a diaphragm of dense substantially incompressible impervious flexible material with a wearing surface formed of plastic material and having a continuous sharp bearing edge engaging the sealing face to provide substantially a line contact, said material being of a hardness to maintain such line contact, a disk finger spring engaging said diaphragm substantially at the edge thereof and pressing said diaphragm against the sealing face of the race with a pressure sufficient to prevent the formation of a migrating film but insufficient to prevent the formation of a lubricating film between the diaphragm and race.

4. A fluid seal, as defined in claim 3, wherein the diaphragm is formed of fabric impregnated with plastic and is of a thickness of about 0.010 to 0.014."

5. A fluid seal comprising, in combination, an outer annular race having a concave beveled sealing face inclined to the plane of the member, an inner flexible substantially incompressible diaphragm member of impervious material having a convex face bearing at its outer edge against said sealing face to form an acute angle therewith and rotatable thereagainst to provide a sealing edge contact, a spring pressing said impervious flexible member against said beveled member and an annular felt member adjacent said spring of larger diameter than and overlying said diaphragm member and engaging the sealing face to protect the diaphragm member.

6. An oil seal comprising, in combination, an outer annular race having a concave beveled sealing face inclined at about 10 to 30° to the plane of the member, a flexible impervious annular diaphragm bearing with yieldable pressure at its outer edge against the bearing face of said beveled member to afford an oil tight sealing engagement and forming a slight angle with said face, a disk finger spring engaging said diaphragm and pressing its outer edge against said sealing face, an annular felt member of a diameter greater than the diameter of said diaphragm adjacent said finger spring and engaging the sealing face to overlie and protect the diaphragm, a sleeve on which the annular diaphragm, spring and annular felt member are mounted, means being provided for securing the annular diaphragm and spring rigidly on the sleeve and for forming an oil tight joint between said diaphragm and sleeve.

7. A fluid seal comprising, in combination, an outer race having a smooth concave sealing face, an inner flexible substantially incompressible impervious diaphragm of material having a wearing surface formed of plastic material and having substantially a line contact only at its outer edge against said sealing face to form an acute angle therewith and rotatable thereagainst to provide a sealing edge contact, said diaphragm being of such thinness and flexibility as to require external support substantially at its edge to maintain the acute angle contact and a disk spring engaging said diaphragm substantially at its edge and pressing the edge against the sealing face to maintain edge contact.

FURNESS HALL HATELY.